(12) United States Patent
Gorti et al.

(10) Patent No.: US 6,538,403 B2
(45) Date of Patent: Mar. 25, 2003

(54) BRUSHLESS DC MOTOR SENSOR CONTROL SYSTEM AND METHOD

(75) Inventors: Bhanuprasad V. Gorti, Abindgon, MD (US); Richard T. Walter, Baldwin, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/742,839

(22) Filed: Dec. 20, 2000

(65) Prior Publication Data

US 2001/0043806 A1 Nov. 22, 2001

Related U.S. Application Data

(60) Provisional application No. 60/175,133, filed on Jan. 7, 2000.

(51) Int. Cl.[7] .................................................. H02P 1/18
(52) U.S. Cl. ....................... 318/254; 318/138; 318/439; 310/40 R; 310/42; 310/68 R
(58) Field of Search ................................. 318/254, 138, 318/439; 310/40 R, 42, 68 R

(56) References Cited

U.S. PATENT DOCUMENTS

| | | | | | |
|---|---|---|---|---|---|
| 3,902,073 A | * | 8/1975 | Lafuze | ..................... | 290/38 R |
| 4,130,469 A | | 12/1978 | Karube | ...................... | 310/46 |
| 4,169,990 A | * | 10/1979 | Lerdman | .................... | 318/138 |
| 4,532,460 A | * | 7/1985 | Gale et al. | .................... | 310/35 |
| 4,883,997 A | | 11/1989 | De Cesare | ................. | 310/179 |
| 4,900,968 A | | 2/1990 | Feigel et al. | ................ | 310/260 |
| 4,942,323 A | | 7/1990 | DeCesare | .................. | 310/208 |
| 5,197,685 A | | 3/1993 | Banner | .................... | 242/1.1 R |
| 5,205,721 A | | 4/1993 | Isaacson | .................... | 417/356 |
| 5,221,881 A | | 6/1993 | Cameron | .................... | 318/254 |
| 5,426,354 A | * | 6/1995 | Bausch | ...................... | 318/254 |
| 5,525,850 A | | 6/1996 | Stinson | ...................... | 310/194 |
| 5,572,097 A | * | 11/1996 | Cameron | ..................... | 318/254 |
| 5,598,071 A | * | 1/1997 | Dunfield et al. | ............ | 318/254 |
| 5,619,085 A | | 4/1997 | Shramo | ...................... | 310/184 |

(List continued on next page.)

FOREIGN PATENT DOCUMENTS

| | | |
|---|---|---|
| DE | 2 217 884 | 10/1973 |
| DE | 25 45 303 | 4/1977 |

(List continued on next page.)

OTHER PUBLICATIONS

PCT International Search Report PCT/US01/50210, Dec. 19, 2001.
PCT International Search Report PCT/US01/00357, Jan. 4, 2000.

Primary Examiner—Rita Leykin
(74) Attorney, Agent, or Firm—Harness, Dickey & Pierce, P.L.C.

(57) ABSTRACT

A system and method for controlling a brushless DC motor (58) is provided. The motor (58) includes a rotor (72) and a stator (96) having at least three phases. The rotor (72) is magnetically coupled to and moveable by the stator (96) when the coils (94) are appropriately energized. Each of the coils (94) is characterized by a corresponding voltage waveform. No more than two position sensors (122) are provided for sensing the position of the rotor (72) during a start-up mode. Each position sensor (122) has an associated position sensor signal. The position sensors (122) are aligned to sense the rotor position such that each position sensor signal indicates a zero torque point corresponding to a phase voltage waveform. The position of the rotor (72) is sensed such that the position sensor signals indicate the start-up operating state of the motor (58). During a first ambiguous start-up state, two predetermined coils (94) are alternately energized. During a defined start-up operating state, one predetermined coil (94) is energized.

32 Claims, 8 Drawing Sheets

U.S. PATENT DOCUMENTS

| | | | |
|---|---|---|---|
| 5,689,159 A | 11/1997 | Culp et al. | 318/254 |
| 5,714,827 A | 2/1998 | Hansson | 310/254 |
| 5,729,065 A | 3/1998 | Fremery et al. | 310/90.5 |
| 5,731,670 A | 3/1998 | Galbiati et al. | 318/254 |
| 5,747,953 A | 5/1998 | Philipp | 318/139 |
| 5,798,592 A | 8/1998 | Peterson | 310/164 |
| 5,903,462 A | 5/1999 | Wagner et al. | 364/474.1 |
| 5,907,205 A | 5/1999 | Herman et al. | 310/152 |
| 5,909,072 A * | 6/1999 | Muller | 318/68 B |
| 6,051,943 A | 4/2000 | Rabin et al. | 318/254 |
| 6,064,175 A | 5/2000 | Lee | 318/809 |
| 6,080,352 A | 6/2000 | Dunfield et al. | 264/427 |
| 6,081,093 A | 6/2000 | Oguro et al. | 318/807 |

FOREIGN PATENT DOCUMENTS

| | | |
|---|---|---|
| DE | 25 48 313 | 5/1977 |
| DE | 26 01 981 | 7/1977 |
| DE | 33 31 002 | 3/1985 |
| DE | 35 10 228 | 9/1986 |
| DE | 35 28 765 | 2/1987 |
| DE | 36 09 351 | 9/1987 |
| DE | 36 20 137 | 12/1987 |
| DE | 37 11 397 | 10/1988 |
| DE | 38 39 932 | 5/1990 |
| DE | 39 98 088 | 5/1991 |
| DE | 40 26 785 | 2/1992 |
| DE | 41 22 391 | 1/1993 |
| DE | 44 32 530 | 3/1996 |
| DE | 44 40 495 | 5/1996 |
| DE | 195 02 907 | 8/1996 |
| EP | 0 107 628 | 5/1984 |
| EP | 0 107 629 | 5/1984 |
| EP | 0 170 641 | 2/1986 |
| EP | 0 254 215 | 1/1988 |
| EP | 0 268 490 | 5/1988 |
| EP | 0 419 435 | 3/1991 |
| EP | 0 490 375 | 6/1992 |
| EP | 0 688 086 | 12/1995 |
| EP | 0 848 474 | 6/1998 |
| FR | 2 677 571 | 12/1992 |
| GB | 2 111 773 | 7/1983 |
| JP | 3-190586 | 8/1991 |
| JP | 9-68222 | 3/1997 |
| WO | WO 88/02192 | 3/1988 |
| WO | WO 93/06647 | 4/1993 |
| WO | WO 96/38903 | 12/1996 |

* cited by examiner

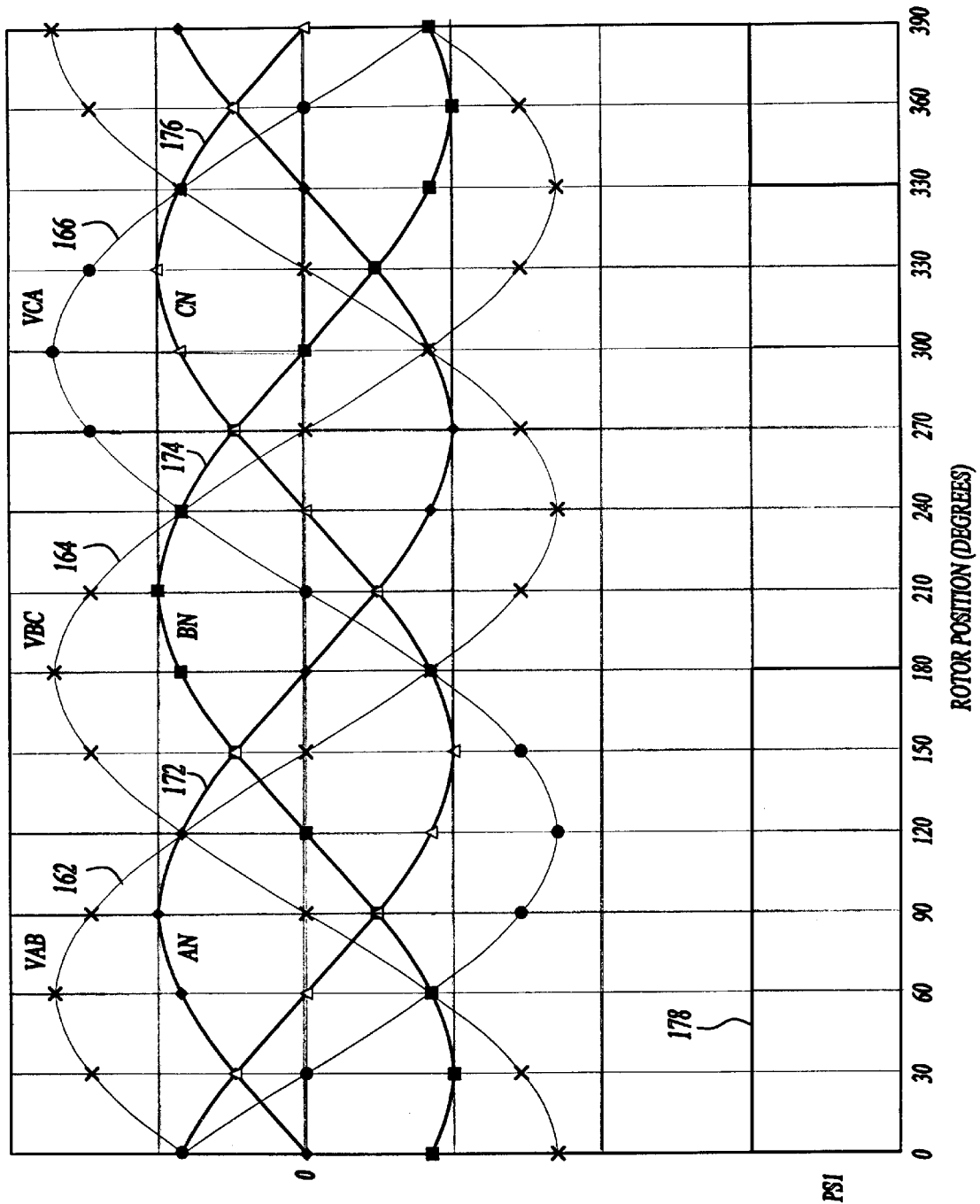

BRUSHLESS DC MOTOR SENSOR CONTROL SYSTEM AND METHOD

CROSS-REFERENCE TO RELATED APPLICATIONS

This application claims the benefit of the filing date of U.S. provisional application No. 60/175,133 filed on Jan. 7, 2000.

BACKGROUND AND SUMMARY OF THE INVENTION

The present invention relates generally to electrically operated power tools and in particular, to motor controllers that control the application of power to brushless DC motors that are used to power portable power tools.

Over the past couple of decades the use of cordless power tools has increased dramatically. Cordless power tools provide the ease of a power assisted tool with the convenience of cordless operation. Generally, cordless tools are driven by a Permanent Magnet (PM) brushed motor that receives DC power from a battery assembly or converted AC power. Recently however, permanent magnet brushless DC motors have been used to cordless power tools.

In a brushless DC motor, commutation is achieved electronically by controlling the flow of current to the stator windings. A brushless DC motor is comprised of a rotor for providing rotational energy and a stator for supplying a magnetic field that drives the rotor. Comprising the rotor is a shaft supported by a bearing set on each end and encircled by a permanent magnet (PM) that generates a magnetic field. The stator core mounts around the rotor maintaining an air-gap at all points except for the bearing set interface. Included in the air-gap are sets of stator windings that are typically connected in either a three-phase wye or delta configuration. Each of the windings is oriented such that it lies parallel to the rotor shaft. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A position sensor circuit senses the position of the rotor as the rotor rotates. In response to signals from the position sensor circuit, a control circuit sequentially activates the individual stator coils so that the PM attached to the rotor continuously chases the advancing magnetic field generated by the stator windings.

Generally, conventional portable tools motor controllers for 3-phase brushless DC motors require three position sensors. The position sensors are typically mounted so that they either detect the magnetic field peaks and nulls associated with the PM or monitor the field from a magnetic device attached to the rotor shaft. The cost of the power tool is affected by the quantity of position sensors that are employed. Costs associated with the position sensors include the cost of the sensor device, the interconnect assemblies that carry the position signals to the control circuit, and production costs associated with mounting additional devices. The consumer market for portable power tools is a highly competitive market in which cost is a major factor in the success or failure of a power tool.

Therefore, reducing the costs associated with a portable power tool is very desirable. One method of reducing the cost of brushless DC motors is to eliminate one or more position sensors. However, when a 3-phase brushless DC motor is operated with fewer than three position sensors, starting the motor becomes problematic; the position of the rotor can longer be determined unambiguously throughout all six operating states. Since the rotor position is ambiguous, the selection of the commutation switches to ensure that positive torque is applied to the rotor is problematic. If negative torque is applied, the rotor will start in the negative direction. In addition, the starting torque of the motor may be insufficient to start the motor while loaded.

The present invention provides a system and method for controlling a brushless DC motor having two or fewer position sensors. The motor includes a rotor and a stator having at least three phases. The rotor is magnetically coupled to and moveable by the stator when the phases are appropriately energized. Each of the phases is characterized by a corresponding voltage waveform. No more than two position sensors are provided for sensing the position of the rotor during a start-up mode. Each position sensor has an associated position sensor signal. The position sensors are aligned to sense the rotor position such that each position sensor signal indicates a zero torque point corresponding to a phase voltage waveform. The position of the rotor is sensed such that the position sensor signals indicate the start-up operating state of the motor. During a first ambiguous start-up state, two predetermined phases are alternately energized. During a defined start-up operating state, one predetermined phase is energized.

For a more complete understanding of the invention, its objects and advantages, reference may be had to the following specification and to the accompanying drawings.

BRIEF DESCRIPTION OF THE DRAWINGS

FIG. 10 is a waveform diagram illustrating the phase voltages and position sensor signal of a one position sensor configuration in accordance with the principles of the present invention.

DETAILED DESCRIPTION OF THE PREFERRED EMBODIMENT

Figure 1:
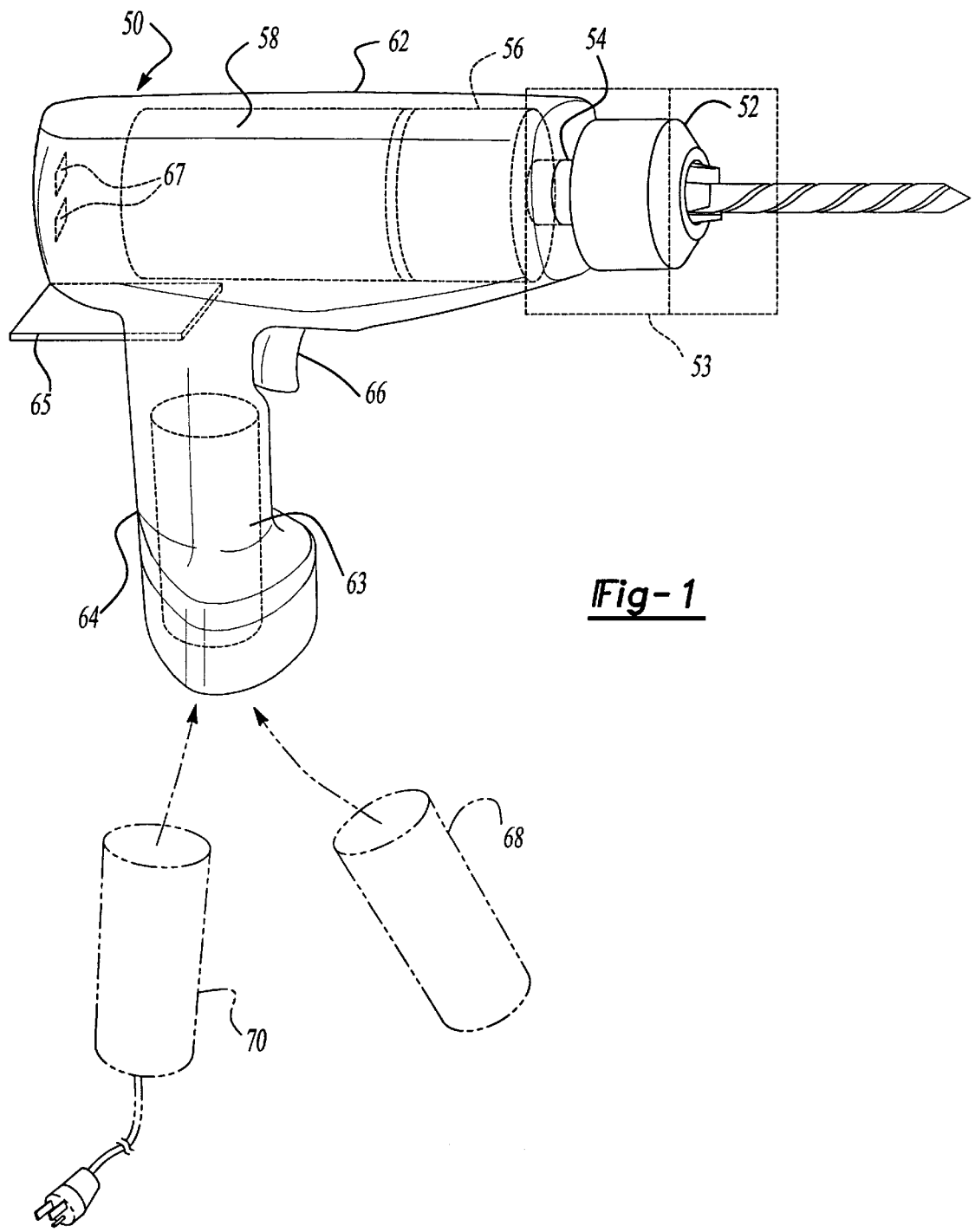
FIG. 1 is a three dimensional view showing a present embodiment of a portable power tool including a brushless DC motor in accordance with the principles of the invention.

Referring to FIG. 1, a portable power tool 50 according to the present invention is shown. While the present invention is shown and described with a power drill 50, it will be appreciated that the particular tool is merely exemplary and could be a circular saw, a reciprocating saw, or any similar portable power tool constructed in accordance with the teachings of the present invention. The power tool 50 includes a tool interface 53 which is driven through a gear train 56 by a DC brushless motor 58. The tool interface in the preferred embodiment includes a chuck 52 secured to a rotatable spindle 54. The motor 58 is mounted within a housing 62 that includes a handle 64 extending therefrom. A trigger switch 66 is mounted in the handle 64 below the motor 58. A controller 65 coupled to the trigger switch supplies drive signals to the motor 58. The controller 65 is mounted below the motor 58 within the housing 62. Alternative locations for mounting the controller 65 include within the handle 64, adjacent to the motor 58 and around the motor 58. A recess 63 is provided in the handle 64 to accept a power module (not shown). The power module is installed within the handle recess 63 to supply electrical power to the motor 58 through the controller 65 in response to actuation of the trigger switch 66. The handle 64 is configured to accept either a cordless battery power module 68 or a corded line power module 70. The battery power module 66 includes a battery assembly (not shown) that provides 18 VDC power to the motor 58. The AC converter power module 70 converts 120 VAC, 60 Hz power to regulated 18 VDC. Although in the preferred embodiment, the power modules 68 and 70 provide 18 VDC power to the motor 58, it is within the scope of the invention to provide any DC voltage that is required by the power tool 50, such as regulated 12 volts or unregulated 100 volts.

Figure 2:
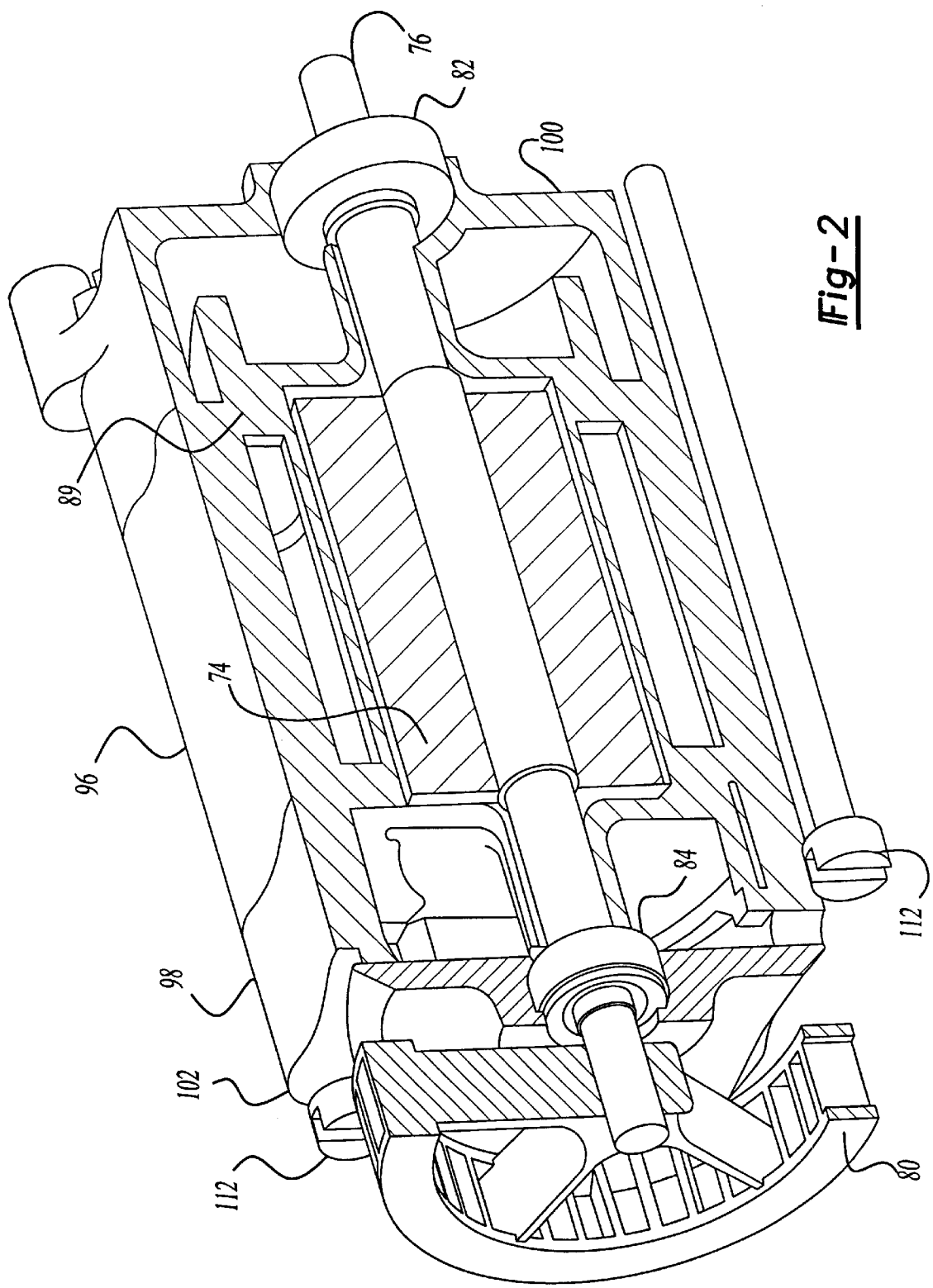
FIG. 2 is a cross-sectional view illustrating a presently preferred embodiment of a brushless DC motor in accordance with the principles of the invention.
Figure 3:
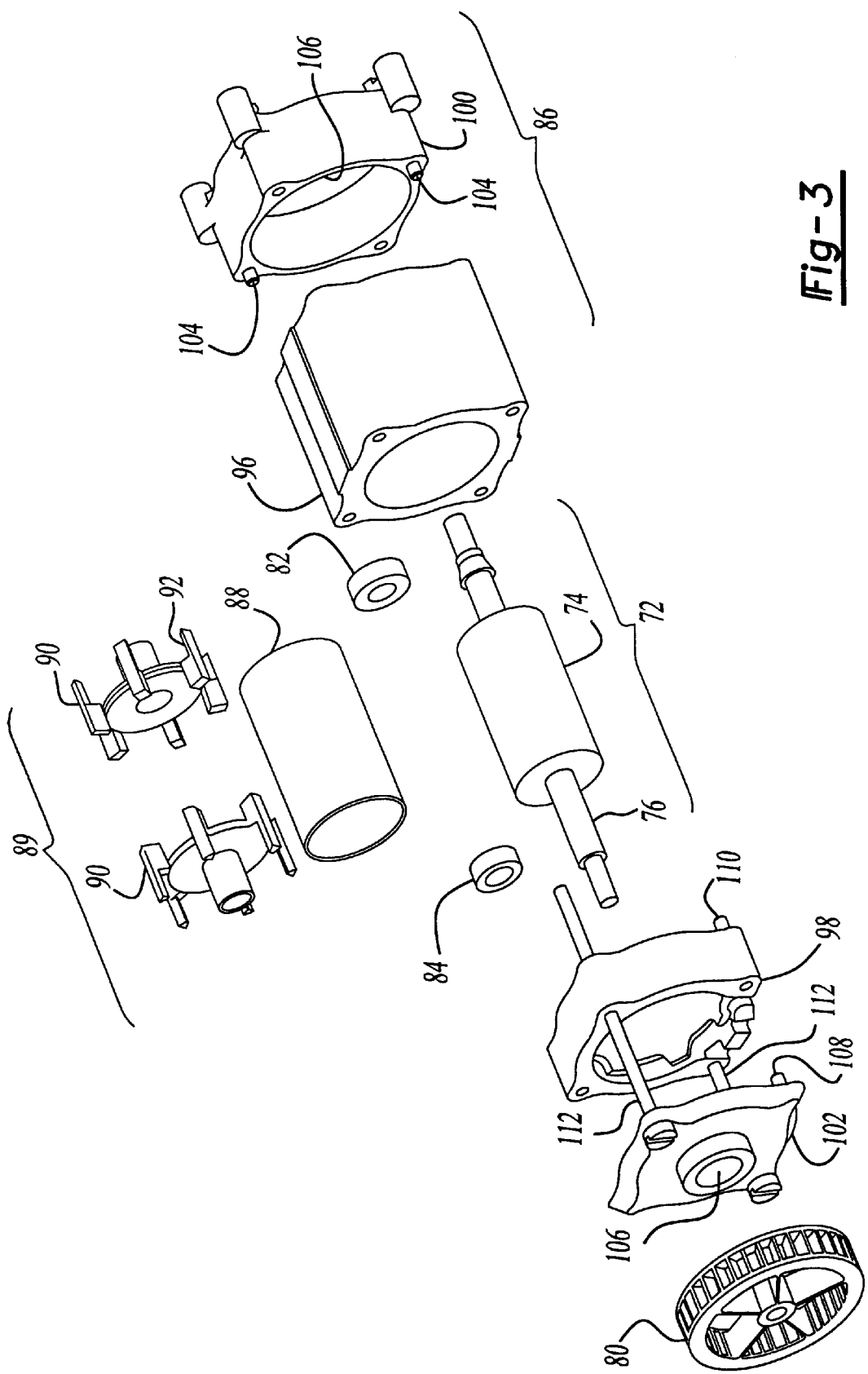
FIG. 3 is an exploded view showing a presently preferred embodiment of a brushless DC motor in accordance with the principles of the invention.

Referring to FIGS. 2 and 3, cut-away and exploded views of the DC brushless motor 58 are illustrated. The motor 58 includes a rotor assembly 72 having a magnetic field for supplying rotational energy to the chuck 52 through the gear train 56. A wound assembly 78 encloses the rotor assembly 72 providing a rotating magnetic field that the rotor assembly magnetic field is drawn towards. A stator assembly 86 provides a magnetic flux return path for the magnetic field generated by the rotor assembly 72. A pair of bearings 82 and 84 located between the rotor assembly 72 and the stator assembly 86 provide a mechanical interface to permit rotation of the rotor assembly 72. A fan 80 attached to the rotor assembly 72 supplies cooling air to the motor 58 and the controller 65.

The rotor assembly 72 comprises a permanent magnet 74 that is bonded to a shaft 76. The shaft 76 in the preferred embodiment is made from magnetic steel although other materials such as stainless steel are within the scope of the invention. The permanent magnet 74 is a one-piece sintered Neodymium Iron Boron (NIB) magnet that is left unmagnetized until the motor 58 is partially constructed. The permanent magnet 74 is then transversely magnetized to provide a two-pole magnet. Although a two-pole NIB magnet is used in the preferred embodiment, it is within the scope of the invention to employ other permanent magnets such as axially magnetized Samarium-Cobalt magnets and Ferrite magnets having four or more poles. To form the NIB magnet, a quantity of Neodymium alloy is milled down to approximately 5 micron. A transverse field is then applied and the milled Neodymium is formed by a press made of ferrous material. Finally, the pressed material is sintered resulting in a near net shaped magnet. The final shape for the magnet is attained by machining the material. The resulting permanent magnet 74 is attached to the shaft 76. The methods of attaching the magnet 74 to the shaft include injection molding and bonding. In the injection molding version, the rotor assembly 72 is inserted into an injection mold. Plastic or epoxy that serves as a bonding agent is injected between the shaft 76 and the permanent magnet 74. The shape of the magnet 74 inside diameter is preferably elliptical while the shaft is round. There is a minimum gap of 0.5 mm per side to allow for the plastic to flow through. In the bonding version, the clearance between the shaft 76 and the magnet is smaller than that required for the injection molding version. This is to compensate for the decreasing strength of cylindrical metal part bonders with increasing gap between bonding surfaces. The rotor assembly 72 is then placed into a winding form 89 prior to winding the coils.

Figure 4A:
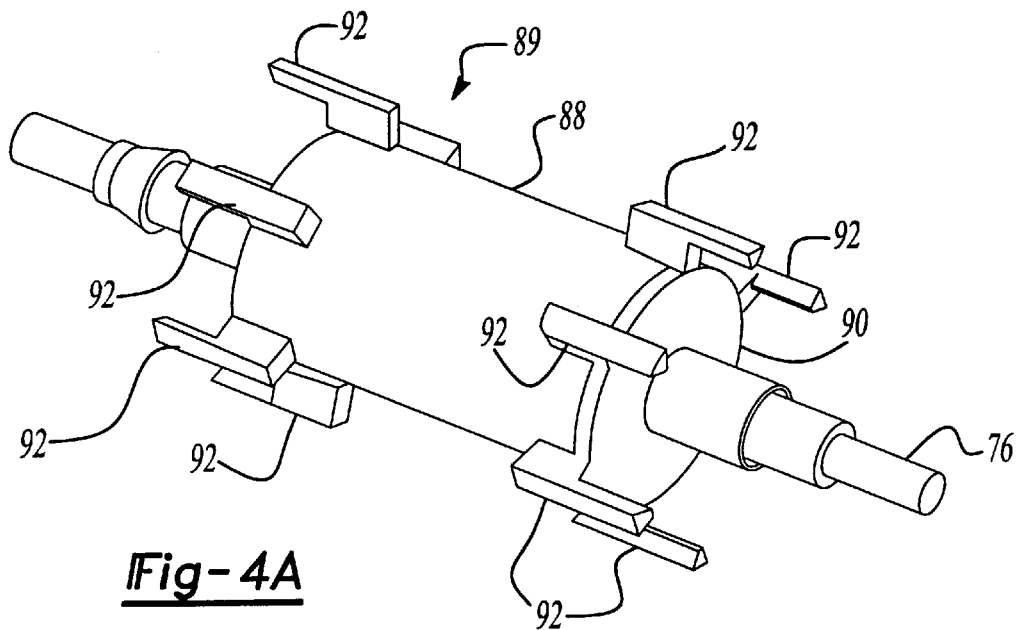
FIG. 4A, is a perspective view of the winding form enclosing the rotor assembly.

Referring to FIG. 4A, a perspective view of the winding form 89 enclosing the rotor assembly 72 is shown. The winding form 89 includes insulating tube 88 and two end plugs 90 that are formed from plastic. In addition, six plastic teeth 92 are integrated to the end plugs 90 to provide winding posts for a set of coils. Although a plastic winding form with plastic teeth is used in the preferred embodiment, the scope of the invention includes using other materials such as magnetic steel and insulated powder metal. Three sets of coils (not shown) are wound onto the winding form 89 so that the coils (not shown) lie substantially parallel to the shaft 76. The coils are constructed with multi-strand magnet wire to obtain a better fill, for ease of winding, and to reduce resistance. A quasi-tumble winding method is used for winding the coils. The winding method is a variation of layer winding that is similar to tumble winding, except for using multiple wire feeds instead of a single wire feed.

Figure 4B:
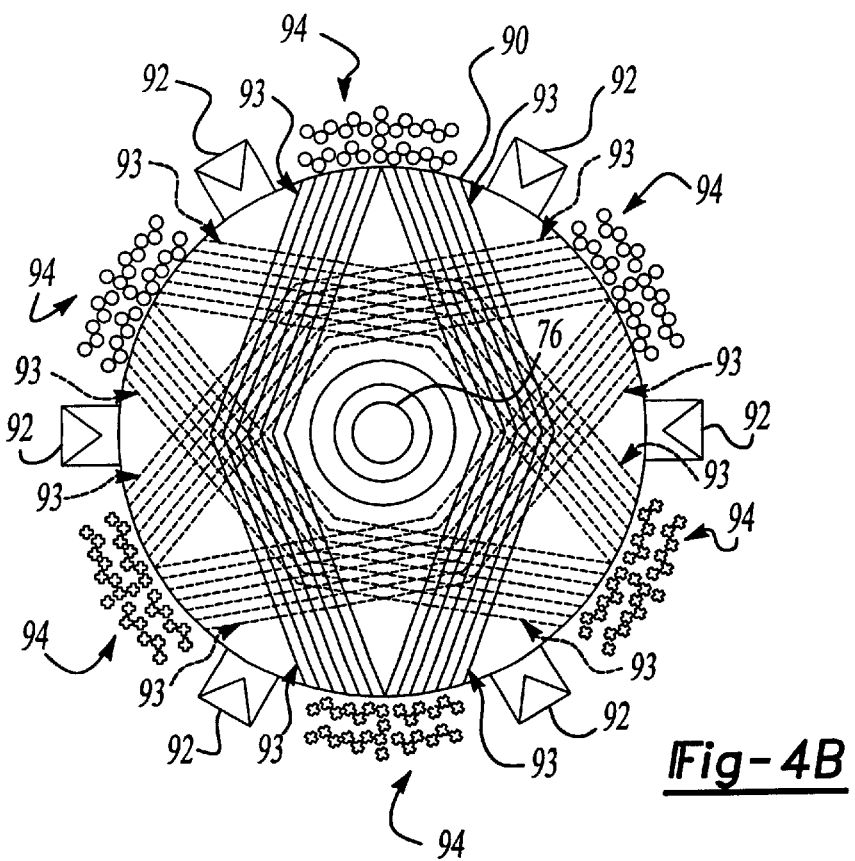
FIG. 4B is an end view of a wound assembly illustrating the arrangement of the coils.

Referring to FIG. 4B, an end view of the wound assembly 78 after winding is shown. The wound assembly 78 includes the winding form 89 enclosing the rotor assembly 72 with the coils 94 wound about the form 89. The coils 94 include end turns 93 that enclose the ends of the rotor assembly such that the rotor assembly 72 is not removable from the wound assembly. The end turns 93 are wound so that the length of wire required for each of the coils 94 is minimized. Minimizing the wire length leads to coils 94 having a lower resistance and therefore lower resistive losses. The resulting increased efficiency of the motor 58 increases the power density and reliability of the motor 58 and reduces the complexity of thermal management circuitry. As well as minimizing the wire length, the end turns 93 are arranged to minimize any gap between the end of the rotor assembly 72 and the end turns 93. Minimizing the gap provides increased coupling between the coils 94 and the permanent magnet 74. Due to the improved coupling, a smaller, less costly permanent magnet 74 can be employed for the motor 58. The preferred embodiment uses a set of three coils connected in a three-phase wye configuration. However, the scope of the invention includes other coil configurations such as two-phase bifilar wound, three-phase delta, and other multi-phase configurations.

Again referring to FIGS. 2 and 3, the stator assembly 86 includes a stator stack 96, an end ring 98, and front end bell 100. In the preferred embodiment, the stator stack is constructed from laminated silicon steel. However, the scope of the invention encompasses using other magnetic materials such as insulated powder metal. The inside of the end ring 98 contains features that mate with one of the end plugs 90 and position the winding form 89 in one of six positions. Although it is preferable that the winding form 89 be keyed in one of the six positions, it is not critical that a certain orientation be achieved. The two end bells 100 and 102 serve as a means of supporting the rotor assembly 72 and retaining it concentric to the winding form 89 while allowing the rotor assembly 72 to spin freely. In the preferred embodiment, the end bells 100 and 102 are made from aluminum, however it is within the scope of the invention to use other materials such as plastic. The forward side of the front end bell 100 is modeled to interface with the gear train 56. The other side of the front end bell 100 includes two posts 104 that mate with the stator stack 96. The front end bell posts 104 are used for location and retention of concentricity between the end bell bearing bore 106 and the stator stack 96. The back end bell 102 includes a sleeve bearing (not shown) and two posts 108 that mate with the end ring 98, which in turn has two posts 110 that interface with the stator stack 96. Two steel pins 112 are inserted through the back end bell 102, the end ring 98, and pressed into the stator stack 96. The steel pins 112 and the posts 110 ensure concentricity between the bearing bore 106 and the stator stack 96.

Figure 5:
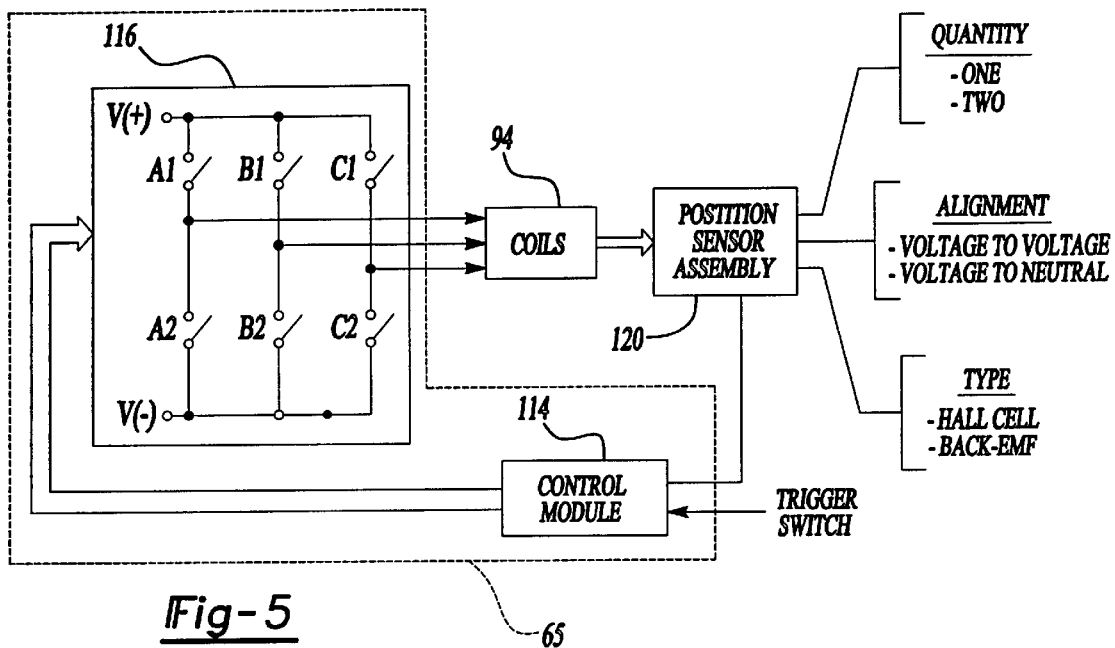
FIG. 5 is a block diagram showing a controller for generating drive signals for the coils.

Referring to FIG. 5, the controller 65 includes a control module 114, a commutation module 116, and a heat sink (not shown). Signals from a position sensor assembly 120 and the trigger switch 66 are coupled to the control module 114, which generates drive signals for controlling the commutation module 116. The output of the commutation module 116 couples to the coils 94 providing drive power for the motor 58. The commutation module 116 includes three pairs of switches (A1–A2, B1–B2, C1–C2) for applying a DC voltage across each of the coils 94. The heat sink is attached to the commutation module 116 to provide a thermal path for power losses. In the preferred embodiment the controller 65 is attached to the side of the motor 58 above the handle 64, however it is within the scope of the invention to locate the controller 65 elsewhere within the power tool 50 such as behind the motor 58 in the back of the power tool 50 and within the handle 64. The controller 65 sequentially switches a DC voltage across each of the phase coils 94 in a manner that generates a rotating magnetic field. In response, the rotor assembly 72 rotates in an attempt to align the magnetic field generated from the permanent magnet 74 with the rotating magnetic field. The operation of the control module 114 will be described in greater detail later in this specification.

Figure 6A:
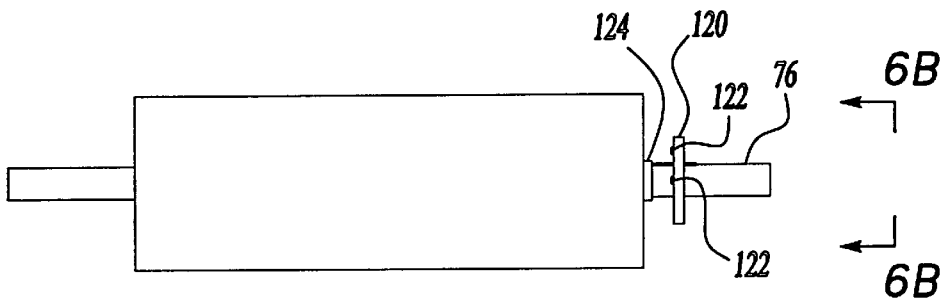
FIG. 6A is a two-dimensional view of the relationship between the sensor magnet and the sensor card.
Figure 6B:
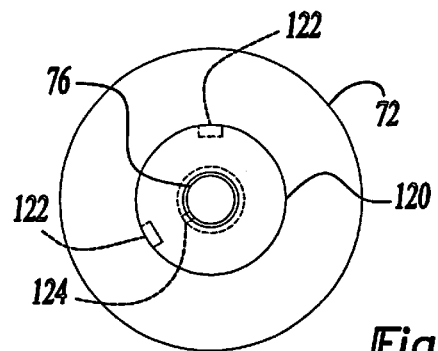
FIG. 6B is an end view of the rotor assembly and sensor card.

Referring to FIGS. 6A and 6B, the position sensor assembly 120 is illustrated. The position sensor assembly 120 senses the orientation of the permanent magnet 74 with respect to the coils 94. In the presently preferred embodiment of the invention, the sensor assembly 120 includes two position sensors 122 spaced 120 degrees apart. Hall cells are employed as the position sensors in the presently preferred embodiment, however the scope of invention includes using other position sensors such as optical sensors. The sensor assembly 120 is mounted so that the position sensors 122 detect the leakage flux generated by the rotor 72. The sensor card 120 has an inner clearance hole and is mounted such that the shaft 76 passes through the card 120 and the position sensors 122 are maintained in close proximity to the rotor 72. The position sensors 122 are aligned to the phase-to-phase voltage of the coils 94. For example, one position sensor 122 is aligned to the phase-A to phase-B voltage and the other position sensor 122 to the phase-A to phase-C voltage. The outputs of the position sensors 122 are coupled to the controller 65 which uses the position sense in conjunction with an input from the trigger switch to determine the timing of the drive signals to the commutation module 116. Although in the presently preferred embodiment of the invention, the position sensors 122 are spaced 120 degrees apart, it is within the scope of the invention for the position sensors 122 to be spaced 60 degrees apart with one inverted sensor signal.

In a one sensor embodiment of the invention, a single position sensor 122 is employed for sensing the position of the rotor 72. Similarly to the preferred embodiment, the position sensor 122 is mounted so that leakage flux generated by the rotor 72 is detected. The position sensor 122 in this embodiment is aligned to the phase-to-neutral voltage of the coils 94. For example, the position sensor 122 may be aligned to the phase-A to neutral voltage or to the phase-B to neutral voltage. By changing the alignment of the position sensor 122, the same conditions that exist in the two sensor approach are now present in the one sensor embodiment. This will be described in greater detail in the section describing the operation of the circuit. As in the preferred embodiment, the output of the position sensor 122 is coupled to the controller 65 which uses the position sense in conjunction with an input from the trigger switch to determine the timing of the drive signals to the commutation module 116.

In another embodiment of the invention, a sensor magnet 124 is mounted on the shaft 76 external to the front end bell 100 to provide a marker of the relative position of the coils 94. The sensor magnet 124 is a 2-pole ring magnet that is unmagnetized until the motor 58 is assembled, at which time an external field is applied to magnetize the sensor magnet 124 in addition to the permanent magnet 74. The position sensors 122 are arranged so that the field generated by the sensor magnet 124 is detected instead of directly sensing leakage flux from the rotor 72. Alignment of the position sensors with the phase voltage is accomplished by either adjusting the location of the sensor magnet 124 upon the shaft 76, or adjusting the position sensor assembly 120.

Figure 7:
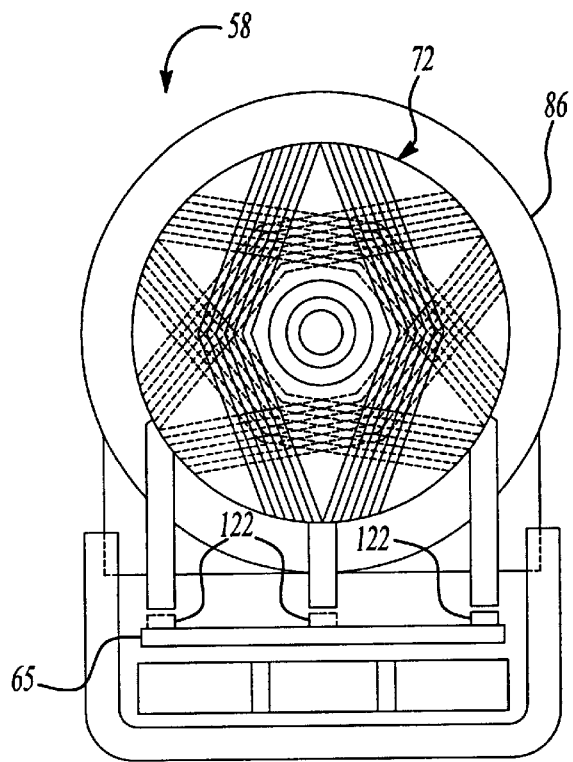
FIG. 7 is a two-dimensional view of a position sensor assembly in accordance with the principles of the present invention.

Referring to FIG. 7, an alternative means of mounting the position sensors is illustrated in an end view of the motor 58. In this embodiment, a sensor channel 125 is provided in the stator assembly 86 to direct leakage flux from the rotor 72 to an associated position sensor 122. For example, in a two position sensor configuration, two sensor channels 125 are provided. To take full advantage of the sensor channel 125, the position sensor 122 is preferably mounted on a printed circuit board (PCB) that includes the components of the controller 65. PCB mounting the position sensors enhances manufacturability by eliminating wiring from the position sensors 122 to the PCB.

Figure 8:
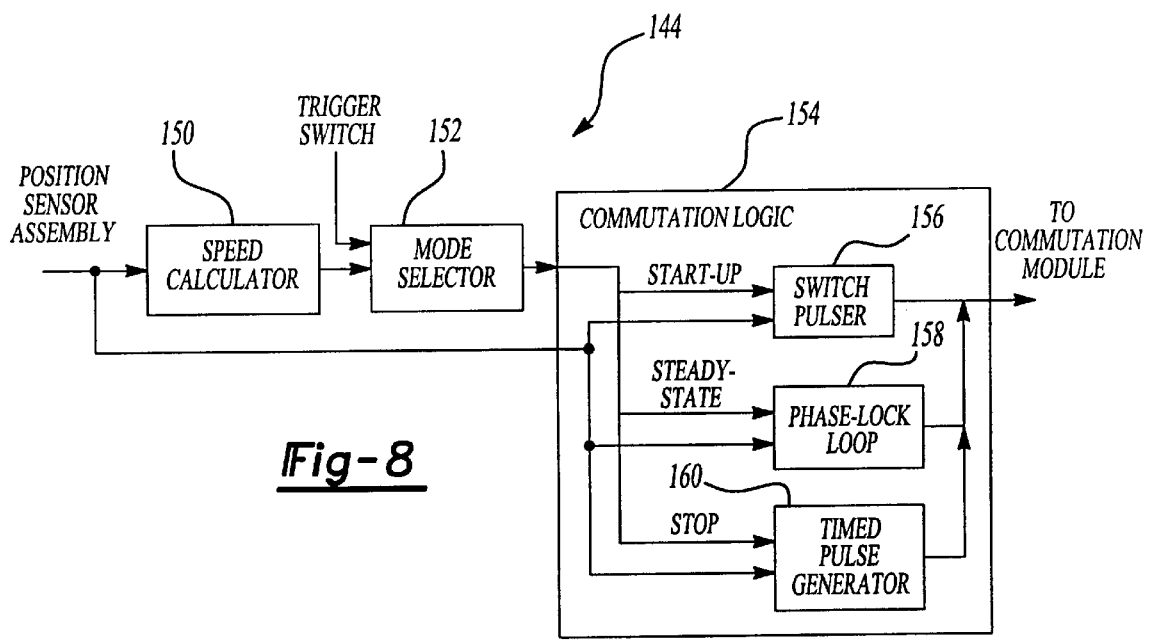
FIG. 8 is a block diagram of a control module in accordance with the principles of the present invention.

Referring to FIG. 8, a block diagram of a presently preferred embodiment of the control module 114 according to the present invention is illustrated. The control module 114 includes a speed calculator 150 to monitor and determine the speed of the rotor 72. A mode selector 152 selects an operating mode for the motor 58 based upon the speed of the rotor 72. In the presently preferred embodiment there are three operating modes: startup mode, steady-state mode, and stop mode. The commutation logic 154 generates the commutation signals for the commutation module 116 based upon the operating mode and the input from the position sensor assembly 120. In startup mode, a switch pulser 156 pulses predetermined sets of switches alternately during predetermined commutation windows. Once the rotor speed reaches a predetermined value, the mode selector 152 switches to steady-state mode. During steady-state mode a phase-lock loop 158 executes control of the motor 58. Stop mode is entered when the controller 65 receives a stop command from the trigger switch 66. During stop mode a timed pulse generator 160 generates timed pulses which are applied to the coils 94 through the commutation module 116 to force the motor 58 a complete stop.

Figure 9:
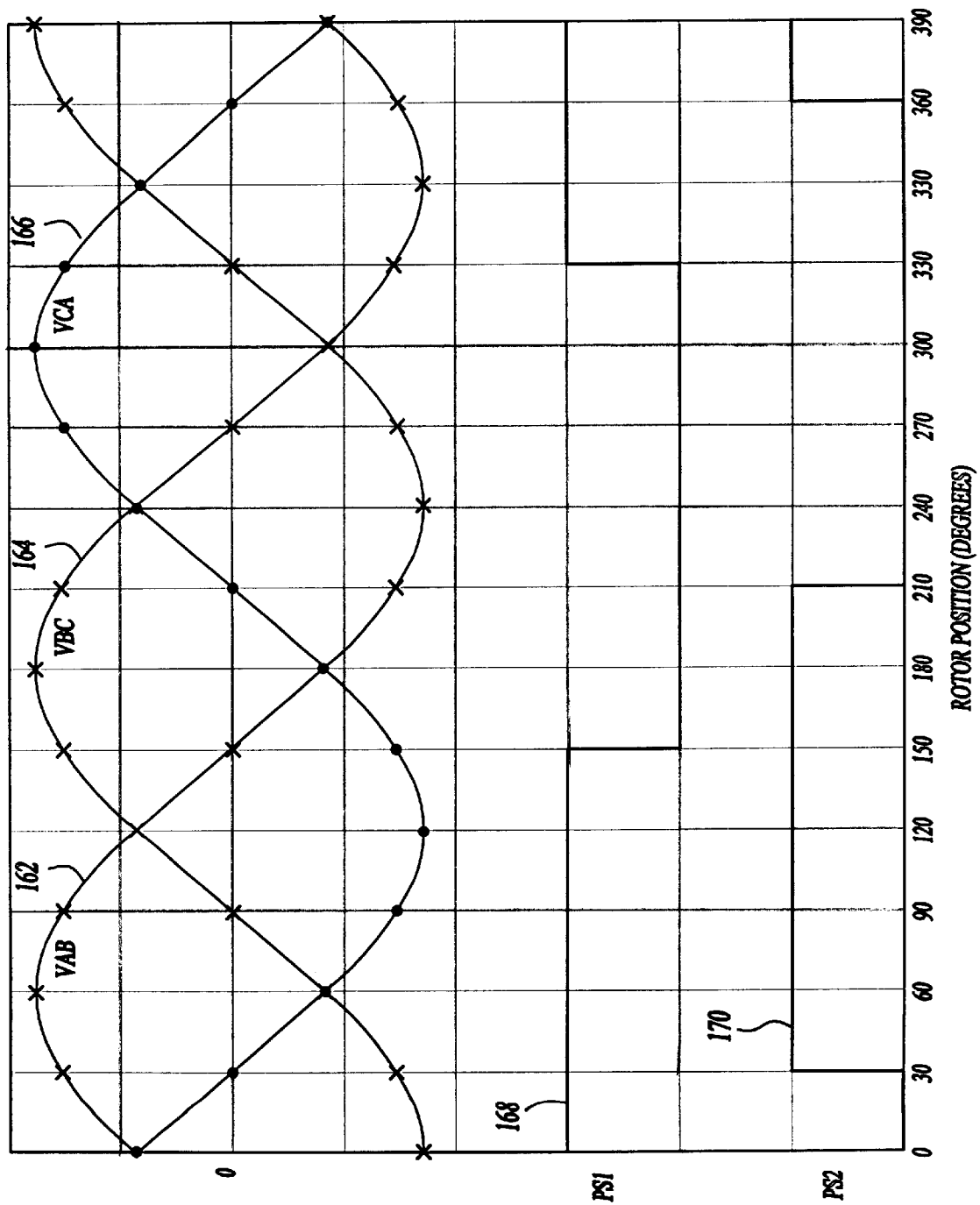
FIG. 9 is a waveform diagram illustrating the phase voltages and position sensor signals of a two position sensor configuration in accordance with the principles of the present invention.

Referring to FIG. 9 and Table 1, the start-up operation of a presently preferred embodiment of a brushless DC motor having a two position sensor configuration in accordance with principles of the invention will be described. FIG. 9 shows the relationship between the position sensor signals, PS1 168 and PS2 170 and the three phase-to-phase voltage waveforms, $V_{AB}$ 162, $V_{BC}$ 164, and $V_{CA}$ 166, associated with the three-phase brushless DC motor. Operating with only two hall cells instead of the normal three hall cells leads to four of the six operating states defining an ambiguous set of switches to which power should be applied.

In a conventional system with three position sensors, each operating state occupies 60 degrees of rotation and has a unique Hall cell code which the controller reads to determine which combination of switches to turn on. The power applied through the switch combination causes the rotor to be pulled with positive torque towards a zero torque position. Before the rotor reaches the zero torque position, it passes to the subsequent operating state in which the controller turns on another set of switches so that the zero torque position is advanced 60 degrees. The rotor is then pulled with positive torque towards the new zero torque position.

Since the presently preferred embodiment of the invention includes only two position sensors, the switch combinations required for four of the six operating states are ambiguous. The ambiguous switch combinations comprise two 120 degree windows that are separated by 60 degree windows in which the required switch combinations are fully defined by the position sensor signals PS1 168 and PS2 170. For example, referring to the 120 degree window described by operating states 1 and 2, the position sensors 122 indicate that top switch A should be turned on with either bottom switch B or C. Depending on the particular switch combination that is applied, there are potential low torque regions within the window where there will not be sufficient torque to start the motor 58. To ensure that sufficient starting torque is generated, the ambiguous switches (in this region, bottom switches B and C) are pulsed alternately until the sensor signals PS1 and PS2 indicate that the rotor 72 has passed on to the next operating state (in this case, state 3). The pulse duration that is applied to the ambiguous switches is selected to be long enough to start moving the rotor 72. The selected pulse duration depends on the motor frame size, rotor inertia, and the motor speed at which control passes from the start-up routine to steady-state mode. In the presently preferred embodiment, the pulse duration is selected to be in the range of 5 msec to 10 msec. Here, the motor mode transition speed is 1000 revolutions per minute, which leads to 10 msec per commutation segment. Therefore, the pulse duration is selected to be no greater than 10 msec. The minimum pulse duration is selected to ensure the rotor begins to move. Although, the pulse duration is held constant throughout the start-up mode in the presently preferred embodiment, it is within the scope of the invention to vary the pulse duration during start-up.

Once the rotor 72 passes on to the next operating state (state 3), the controller 65 sets the switches to the switch combination associated with that operating state. During the corresponding 60 degree window, the rotor 72 is then pulled with positive torque towards the new zero torque position.

Once the motor 58 reaches a predetermined speed, the controller 65 selects one of the two position sensor signals 168 and 170 for measuring the rotor speed. The controller 65 then executes steady-state, phase-locked, electronic commutation based on zero crossings detected by the selected position sensor. Although, a Hall cell is preferably used during steady-state operation, it is within the scope of the invention to use a motor back-emf signal.

By alternately pulsing the ambiguous switch combinations it is possible to start the motor in a predetermined direction even under resonable loads of up to 86.6 percent of the peak torque.

TABLE 1

Two position sensors

| State | Rotor Position (deg) | | Sensor 1 | Sensor 2 | Top Switch | Bottom Switch | Zero Torque Angle |
|---|---|---|---|---|---|---|---|
| 1 | 30 | 90 | 1 | 1 | A | B or C | 150/210 |
| 2 | 90 | 150 | 1 | 1 | A | B or C | 150/210 |
| 3 | 150 | 210 | 0 | 1 | B | C | 270 |
| 4 | 210 | 270 | 0 | 0 | B or C | A | 330/30 |
| 5 | 270 | 330 | 0 | 0 | B or C | A | 330/30 |
| 6 | 330 | 30 | 1 | 0 | C | B | 90 |

Referring to FIG. 10 and Table 2, the start-up operation of a presently preferred embodiment of a brushless DC motor having a one position sensor configuration in accordance with the principles of the invention will be described. FIG. 10 shows the relationship between the position sensor signal, PS, 178 and the three phase-to-neutral voltage waveforms, $V_{AN}$ 172, $V_{BN}$ 174, and $V_{CN}$ 176, associated with the three-phase brushless DC motor 58. Operating with only one position sensor instead of the normal three position sensors leads to all six operating states defining ambiguous sets of switches to which power should be applied. The position sensor alignment in the one position sensor configuration is shifted 30 degrees from the 2 position sensor configuration so that the position sensor 122 senses the zero crossing of a voltage-to-neutral waveform instead of a voltage-to-voltage waveform. By changing the alignment by 30 degrees, the same torque development conditions that existed in the two position sensor approach exist in the one position sensor configuration.

Similar to the two position sensor configuration, sets of switch configurations are pulsed alternately to produce a sufficient starting torque to move the rotor 72. The ambiguous switch combinations comprise two 180 degree windows.

Referring to the 180 degree window described by operating states 1, 2, and 3, the position sensor indicates that top switch A should be turned on with either bottom switch B or C. Depending on the particular switch combination that is applied, there are potential negative torque regions within the window where there will not be sufficient torque to start the motor 58. To ensure that sufficient starting torque is generated, the ambiguous switches (in this region bottom switches B and C) are pulsed alternately until the sensor signal PS 178 indicates that the rotor 72 has passed on to the next operating state (in this case, state 4). The criteria used for selecting the pulse duration is the same as the criteria applied to the two position sensor configuration.

Once the rotor passes to the next operating state (states 4, 5, and 6) as indicated by a transition of the position sensor signal 178, the controller 65 sets the switches to the switch combination associated with that operating state. Here, bottom device A is switched on, and top devices B and C are pulsed alternately until the position sensor signal transitions.

Once the motor 58 reaches a predetermined speed, the controller 65 transitions to steady-state operation. During steady-state, switch commutation is phase-locked to zero crossings detected by the position sensor. Although, a Hall cell is preferably used during steady-state operation, it is within the scope of the invention to use a motor back-emf signal for detecting zero crossings.

TABLE 2

One position sensor

| State | Rotor Position | Sensor | Top Switch | Bottom Switch | Zero Torque Angle |
|---|---|---|---|---|---|
| 1 | 0 | 60 | 1 | A | B or C | 150/210 |
| 2 | 60 | 120 | 1 | A | B or C | 150/210 |
| 3 | 120 | 180 | 1 | A | C or B | 150/210 |
| 4 | 180 | 240 | 0 | B or C | A | 330/30 |
| 5 | 240 | 300 | 0 | B or C | A | 330/30 |
| 6 | 300 | 360 | 0 | C or B | A | 330/30 |

Thus it will be appreciated from the above that as a result of the present invention, a brushless DC motor sensor system and method is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method for controlling a brushless DC motor including a rotor and a stator having at least three phases, the rotor being magnetically coupled to and moveable by the stator when the phases are appropriately energized, each of the phases being characterized by a corresponding voltage waveform, comprising the steps of:
   providing no more than two position sensors for sensing a rotor position during a start-up mode, each position sensor having an associated position sensor signal;
   aligning the position sensors to sense the rotor position such that each position sensor signal indicates a zero torque point corresponding to a phase voltage waveform;
   sensing the position of the rotor such that the position sensor signals indicate a start-up operating state;
   during a first ambiguous start-up state:
      alternately energizing two predetermined phases; and
   during a defined start-up operating state:
      energizing one predetermined phase.

2. The method of claim 1 further including the step of determining a rotor speed.

3. The method of claim 2 further including the step of selecting a steady-state mode when the rotor speed exceeds a predetermined speed.

4. The method of claim 3 further including the step of executing phase-lock loop operation during steady-state mode.

5. The method of claim 1 wherein two position sensors are provided for sensing the rotor position during the start-up mode.

6. The method of claim 5 wherein each of the position sensors is aligned with a voltage-to-voltage waveform.

7. The method of claim 6 wherein the step of alternately energizing includes pulsing the phase for a predetermined pulse duration.

8. The method of claim 7 wherein the pulse duration is fixed.

9. The method of claim 8 further including the step of determining a rotor speed.

10. The method of claim 9 further including the step of selecting a steady-state mode when the rotor speed exceeds a predetermined speed.

11. The method of claim 10 further including the step of generating a timed pulse to stop the rotor in a predetermined position.

12. The method of claim 1 wherein one position sensor is provided for sensing the rotor position during the start-up mode.

13. The method of claim 12 wherein the position sensor is aligned with a voltage-to-neutral waveform.

14. The method of claim 13 wherein the step of alternately energizing includes pulsing the phase for a predetermined pulse duration.

15. The method of claim 14 wherein the pulse duration is fixed.

16. The method of claim 15 further including the step of determining a rotor speed.

17. The method of claim 16 further including the step of selecting a steady-state mode when the rotor speed exceeds a predetermined speed.

18. A method for controlling a brushless DC motor including a rotor and a stator having at least three phases, the rotor being magnetically coupled to and moveable by the stator when the phases are appropriately energized, each of the phases being characterized by a corresponding voltage waveform, comprising the steps of:
   providing two position sensors for sensing a rotor position during a start-up mode, each position sensor having an associated position sensor signal;
   aligning the position sensors to sense the rotor position such that each position sensor signal indicates a zero torque point corresponding to a phase voltage waveform;
   determining a rotor speed;
   selecting an operating mode based on the rotor speed, the operating mode being a start-up mode for rotor speed up to about a predetermined speed and steady-state mode for rotor speed more than the predetermined speed;
   during the start-up mode:
      sensing the position of the rotor such that the position sensor signals indicate a start-up operating state;
      during a first ambiguous start-up state:
         alternately energizing two predetermined phases; and
      during a defined start-up state:
         energizing one predetermined phase.

19. The method of claim 18 further including the step of selecting a steady-state mode when the rotor speed exceeds a predetermined speed.

20. The method of claim 19 wherein each of the position sensors is aligned with a voltage-to-voltage waveform.

21. The method of claim 19 wherein the step of alternately energizing includes pulsing the phase for a predetermined pulse duration.

22. The method of claim 21 wherein the pulse duration is selectable.

23. A cordless power tool, comprising:
   a brushless DC motor for converting electrical energy to mechanical energy, including;
      a rotor and a stator having at least three coils configured in a three-phase configuration, the rotor being magnetically coupled to and moveable by the stator when the coils are appropriately energized, each of the phases being characterized by a corresponding voltage waveform a position sensor assembly for sensing the positional relationship between the rotor and the coils, the position sensor assembly having no more than two position sensors for sensing a rotor position during a start-up mode, each position sensor having an associated position sensor signal, the position sensors being aligned to sense the rotor position such that each position sensor signal indicates a zero torque point corresponding to a phase voltage waveform; and a controller, responsive to said position sensor assembly, for controlling the supply of power to the brushless DC motor, including;
  a commutation module for energizing the coils;
  a control module coupled to the commutation module for controlling the application of energy to the coils, including;
    a speed calculator for determining a rotor speed;
    a mode selector, in response to the rotor speed, for selecting an operating mode for energizing the coils;
    a switch pulser coupled to the mode selector, activable during a start-up mode, to alternately energize two predetermined phases; and a power module for supplying electrical energy to the brushless DC motor;

a tool interface for interfacing the DC motor with a tool; and a housing for enclosing the power module, controller and DC motor.

24. The cordless power tool of claim 23 wherein the control module further includes a timed pulse generator coupled to the mode selector, activable during a stop mode, to generate a timed pulse to stop the rotor in a predetermined position.

25. The cordless power tool of claim 23 wherein each of the position sensors is aligned with a voltage-to-voltage waveform.

26. The cordless power tool of claim 23 wherein the switch pulser alternately energizes each of the two predetermined phases for a predetermined pulse duration.

27. The cordless power tool of claim 26 wherein the pulse duration is selectable.

28. The cordless power tool of claim 23 wherein the control module further includes a phase lock loop coupled to the mode selector, activable during a steady-state mode, to execute phase-lock operation.

29. The cordless power tool of claim 23 wherein the stator further includes at least one sensor channel in magnetic field communication with the position sensor assembly.

30. A brushless DC motor, comprising;
  a rotor assembly including a rotatable shaft and a permanent magnet affixed to the shaft, said permanent magnet for generating a magnetic field;
  a winding form enclosing the rotor assembly;
  a plurality of coils wound upon the winding form to produce a magnetic field for applying a torque to the rotor assembly, said coils being connected in a three phase configuration having a positional relationship with the permanent magnet;
  a stator stack made of a stator magnetic material for providing a magnetic flux return path for the magnetic field of the permanent magnet, the stator stack including a sensor channel to direct leakage flux from the permanent magnet to an associated position sensor;
  a position sensor system for sensing the positional relationship that the coils have with the permanent magnet, the position sensor system including at least one position sensor in magnetic flux communication with the sensor channel; and
  a controller coupled to the position sensor for controlling the application of a power source to the coils in response to the positional relationship of the coils and the permanent magnet.

31. The brushless DC motor of claim 30 wherein the stator stack includes no more than three sensor channels.

32. The brushless DC motor of claim 31 wherein the position sensor is a Hall cell.

* * * * *